(12) United States Patent
Park

(10) Patent No.: US 12,290,210 B2
(45) Date of Patent: May 6, 2025

(54) BLENDER

(71) Applicant: LG ELECTRONICS INC., Seoul (KR)

(72) Inventor: Seungje Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 757 days.

(21) Appl. No.: 17/612,999

(22) PCT Filed: Aug. 6, 2020

(86) PCT No.: PCT/KR2020/010375
§ 371 (c)(1),
(2) Date: Nov. 19, 2021

(87) PCT Pub. No.: WO2021/029607
PCT Pub. Date: Feb. 18, 2021

(65) Prior Publication Data
US 2022/0202255 A1     Jun. 30, 2022

(30) Foreign Application Priority Data
Aug. 13, 2019 (KR) .................. 10-2019-0098861

(51) Int. Cl.
*A47J 43/07* (2006.01)
*A47J 43/046* (2006.01)

(52) U.S. Cl.
CPC ......... *A47J 43/0777* (2013.01); *A47J 43/046* (2013.01)

(58) Field of Classification Search
CPC ............................ A47J 43/0777; A47J 43/046
See application file for complete search history.

(56) References Cited

U.S. PATENT DOCUMENTS

| 6,910,800 B2 | 6/2005 | Wu |
| 2017/0095122 A1* | 4/2017 | Hoare ............... A23N 1/003 |
| 2018/0020875 A1* | 1/2018 | Kolar ............ A47J 43/0777 366/279 |

FOREIGN PATENT DOCUMENTS

KR    20-2019-0001841 U    7/2019

* cited by examiner

*Primary Examiner* — Elizabeth Insler
(74) *Attorney, Agent, or Firm* — Bryan Cave Leighton Paisner LLP

(57) ABSTRACT

Proposed is a blender in which when the closure of a container lid of a container body is detected, a main body operates. In the blender, a transparent conductive member is disposed to electrically connect an upper end part of the container body with a lower end part of the container body such that the transparency of the container body is maintained, and when the closure of the container lid of the container body is detected, power is transmitted from a first induction coil of the main body to a second induction coil of the container body, and when receiving the change of the current of the first induction coil caused by a magnetic field of the second induction coil generated by the power transmitted to the second induction coil, the main body recognizes the closure of the container lid of the container body and operates.

19 Claims, 16 Drawing Sheets

BLENDER

This application is a National Stage Application of International Application No. PCT/KR2020/010375, filed on Aug. 6, 2020, which claims priority to and benefit of Korean Application No. 10-2019-0098861, filed on Aug. 13, 2019, which are hereby incorporated by reference in their entirety for all purposes as if fully set forth herein.

TECHNICAL FIELD

The present disclosure relates generally to a blender. More particularly, the present disclosure relates to a blender in which a main body operates when the closure of a container lid of a container body is detected.

BACKGROUND ART

Generally, a blender is a household appliance which chops or crushes food received in a container body by blades rotated by an electric motor, and is also commonly referred to as a food mixer.

In such a blender, the container body is seated on the upper surface of a main body in which the motor is provided, and when the container body is seated, the blades provided in the container body are connected to a rotating shaft of the motor to be rotatable.

After a user puts food in the container body through an open portion of the container body and closes a container lid thereof, the user operates the motor by manipulating the main body to rotate the blades such that the food is crushed.

The container lid closes the open portion of the container body to protect food inside the container body. For safety during the operation of the blender, the blades are not rotated in a state in which the container lid does not close the container body. That is, to prevent accidents due to the blades, the blades are preferably allowed to be rotated only when the closure of the container lid of the container body is detected.

Conventionally, various methods of detecting the closure of a container lid have been proposed.

For example, in U.S. Pat. Nos. 6,910,800 and 7,871,196, a push rod physically connecting the container body with the blender body is provided, and when the container lid closes the container body, the container lid presses the push rod. A press detection part of the main body detects the pressing of the container lid, and detects the closure of the container lid.

However, the push rod and the press detection part are required to be separately installed, and the press detection part may be contaminated due to moisture or food that may enter the press detection part.

In addition, the push rod of the container body and the press detection part of the main body are required to be installed at positions corresponding to each other, so there is a problem that the container body is required to be mounted only in a specific direction.

Additionally, the push rod is required to be installed along the container body in a longitudinal direction thereof from the container body to the main body, so the design of the container body made of a transparent material is spoiled.

Recently, in order to solve this problem, a technique of detecting the closure of the container lid of the container body by the main body by using wireless communication or electromagnetic coupling between the container body and the main body has been disclosed.

For example, in European Patent No. EP2548485, when a container lid closes the container body, a blender detecting the closure of the container lid of the container body by the main body by using a wireless communication module is disclosed.

However, in such a prior art, the wireless communication module is required, and a separate power supply is required to be provided in the container body so as to drive the wireless communication module.

For another example, in US Patent Application Publication No. 2018/0020875, an interlocking blending device is disclosed in which a transmitting coil and a receiving coil are disposed in the main body, and a receiving coil and a transmitting coil are disposed in a container body so as to correspond to the transmitting coil and receiving coil, respectively, and when a container lid closes the container body, power is transmitted to the receiving coil of the container body through the transmitting coil of the main body, and in turn, the power is transmitted to the receiving coil of the main body through the transmitting coil of the container body, so that the main body detects the closure of the container lid of the container body.

However, in such a prior art, two coils, that is, a transmitting coil and a receiving coil, are required to be installed in each of the main body and the container body, and a device analyzing power received by the receiving coil of the main body is required.

In addition, two coils are arranged in each of the main body and the container body, and when electric current flows through each coil, induced currents change due to interference between magnetic fields induced in the coils. Accordingly, it is difficult to accurately analyze power received by the receiving coil of the main body.

Furthermore, power is transmitted from the transmitting coil of the main body to the receiving coil of the container body, and due to the closure of a container lid of the container body, the power is transmitted from the transmitting coil of the container body to the receiving coil of the main body. In order to allow the receiving coil of the main body to receive effective power, high power is required to be transmitted from the transmitting coil of the main body to the receiving coil of the container body.

Additionally, to electrically connect a container lid detection circuit with the main body, a conductive member is installed along the transparent container body, and thus the design of the transparent container body is spoiled.

DISCLOSURE

Technical Problem

The present disclosure is intended to propose a blender in which one induction coil may be disposed in a main body and one induction coil may be disposed in a container body and through one inductive coupling between the two induction coils, the closure of a container lid of the container body is detected.

The present disclosure is intended to propose a blender in which a detection error or contamination due to external contaminants such as water or food is prevented.

The present disclosure is intended to propose a blender in which the design of the container body made of a transparent material is maintained.

The present disclosure is intended to propose a blender in which the closure of the container lid of the container body is accurately detected with low power.

The present disclosure is intended to propose a blender in which induction coils mounted to the main body and the container body, respectively, are configured to be removable therefrom.

The present disclosure is intended to propose a blender in which when the container lid closes the container body, a magnetic field induced in an electromagnet is detected such that the main body can detect the closure of the container lid of the container body.

The objectives of the present disclosure are not limited to the objectives mentioned above, and other objectives not mentioned may be clearly understood by those skilled in the art to which the present disclosure belongs from the following description.

Technical Solution

In a blender of the present disclosure, through one-time inductive coupling between a first induction coil mounted to a main body and a second induction coil mounted to a container body, a current detection part mounted to the main body may detect the change of current of the first induction coil, so that the main body may detect the closure of the container lid of the container body.

In the blender of the present disclosure, according to the closure of the container lid of the container body, inductive coupling between the first induction coil and the second induction coil of the container body may be performed.

In the blender of the present disclosure, power may be generated in the second induction coil by inductive coupling between the first induction coil of the main body and the second induction coil of the container body, and the generated power may be used to form an electromagnet and generate a magnetic field.

In the blender of the present disclosure, when the container lid of the container body is closed, a detection module disposed in the container body may detect the closure of the container lid, and when the closure of the container lid is detected by the detection module, inductive coupling between the first and second induction coils may be performed.

In the blender of the present disclosure, the detection module mounted to the upper part of the container body and the second induction coil mounted to the lower part of the container body may be electrically connected to each other through a conductive member made of a transparent material disposed from the upper part of the container body to the lower part thereof in the longitudinal direction of the container body.

In the blender of the present disclosure, a transparent electrode film (ITO) may be used as the conductive member, and the conductive member may be disposed in the longitudinal direction of the transparent container body from the upper part of the container body to the lower part thereof.

In the blender of the present disclosure, the first end of the transparent electrode film may be electrically connected to the detection module by a first connector which is detachable, and the second end of the transparent electrode film may be electrically connected to the second induction coil by a second connector which is detachable.

In the blender of the present disclosure, the first induction coil and the second induction coil may be disposed to be parallel to each other by facing each other such that the first induction coil and the second induction coil have the same center points, so inductive coupling between the first and second induction coils may be effectively performed.

In the blender of the present disclosure, the first and second induction coils may be configured to be patterned on first and second PCB substrates, respectively, so as to be disposed to have easy and simple configuration.

In the blender of the present disclosure, when the container body is mounted to the main body, the first and second PCB substrates may be installed to be parallel to each other by facing each other, such that the first and second induction coils patterned on the first and second PCB substrates, respectively, have the same center points, so inductive coupling between the first and second induction coils may be effectively performed.

In the blender of the present disclosure, the first and second PCB substrates may be attached to and detached from the main body and the container body, respectively, so inductive coils may be easily and simply replaced.

In the blender of the present disclosure, when the current detection part detects the change of current of the first induction coil, the main body may detect the closure of the container lid of the container body and may operate.

Advantageous Effects

The blender according to the present disclosure has the following effects.

First, in the blender of the present disclosure, the second induction coil may be disposed on the lower part of the container body, and the first induction coil may be disposed on the upper part of the main body, and thus according to the closure of the container lid, only one-time inductive coupling between the first and second induction coils may be performed, thereby realizing simple control and operation and preventing interference of a magnetic field between the induction coils compared to a prior art.

Second, in the blender of the present disclosure, a module and a device configured to detect the closure of the container lid of the container body may be installed inside the container body and the main body, thereby preventing a detection error or contamination due to external contaminants such as water or food.

Third, in the blender of the present disclosure, for electrical connection between modules, the transparent electrode film (ITO) may be used to be disposed inside and outside of the container body, thereby maintaining the design of the transparent container body.

Fourth, in the blender of the present disclosure, an electromagnet and a magnetic sensor may be used when detecting the closure of the container lid of the container body, thereby accurately detecting the closure of the container lid of the container body with low power.

Fifth, in the blender of the present disclosure, the first and second induction coils may be patterned on PCB substrates, respectively, thereby having an easy and simple configuration.

Sixth, in the blender of the present disclosure, the first and second induction coils mounted to the main body and the container body, respectively, may be attached thereto and detached therefrom, thereby enabling easy mounting and convenient replacement.

MODE FOR INVENTION

Figure 1:
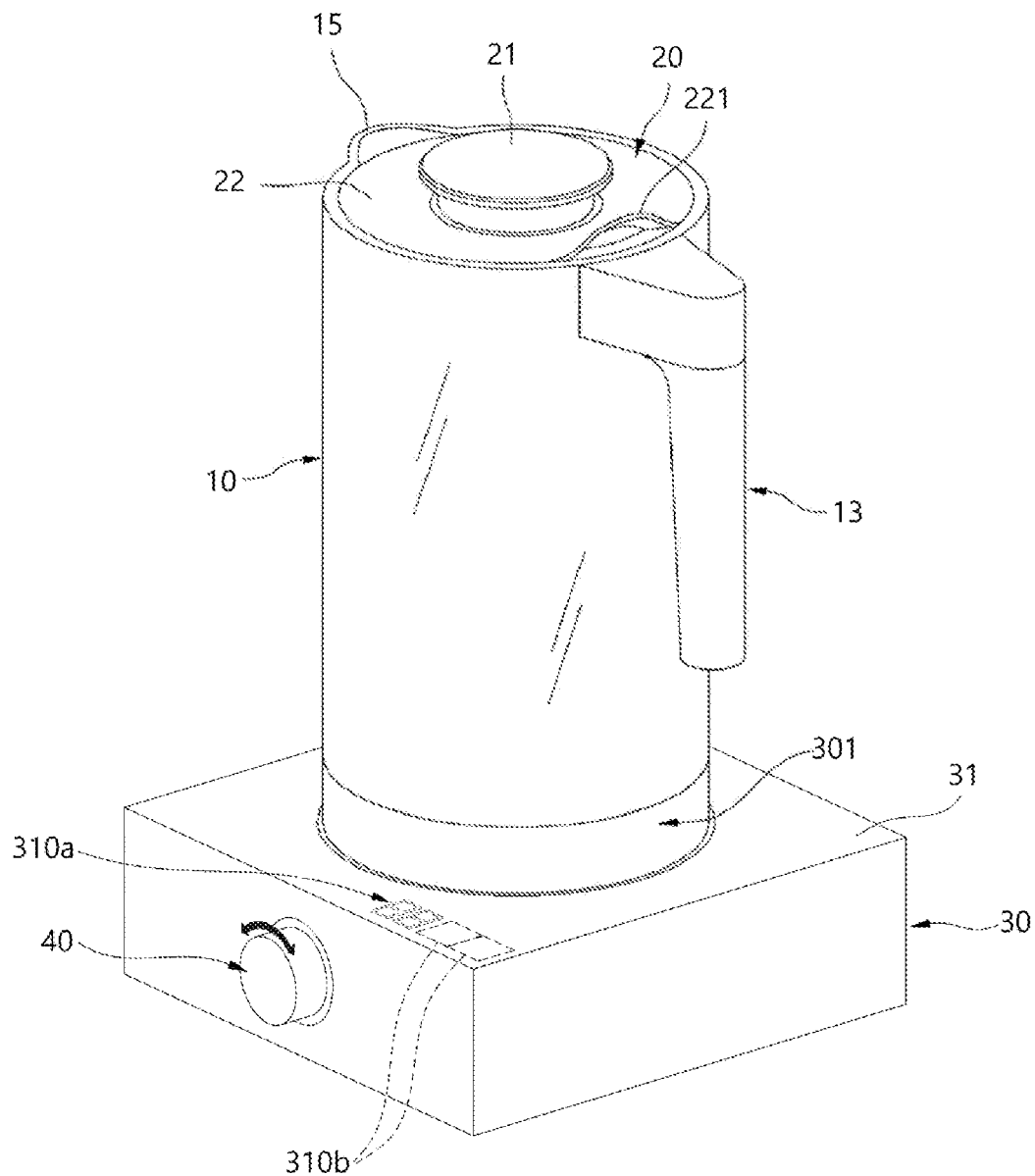
FIG. 1 is a perspective view of an exterior of a blender according to an embodiment of the present disclosure.

Advantages and features of the present disclosure and a method of achieving them will become apparent by referring to embodiments described below in detail in conjunction with the accompanying drawings. However, the present disclosure is not limited to the embodiments disclosed below and may be implemented in various different forms. The present embodiments are only provided to fully inform those of ordinary skill in the art to which the present disclosure belongs of the scope of the invention so that the disclosure of the present disclosure is complete. The present disclosure is defined by the scope of the claims. Like reference numerals refer to like elements throughout the specification.

Hereinafter, a blender of the present disclosure will be described in detail with reference to the accompanying drawings.

Figure 2:
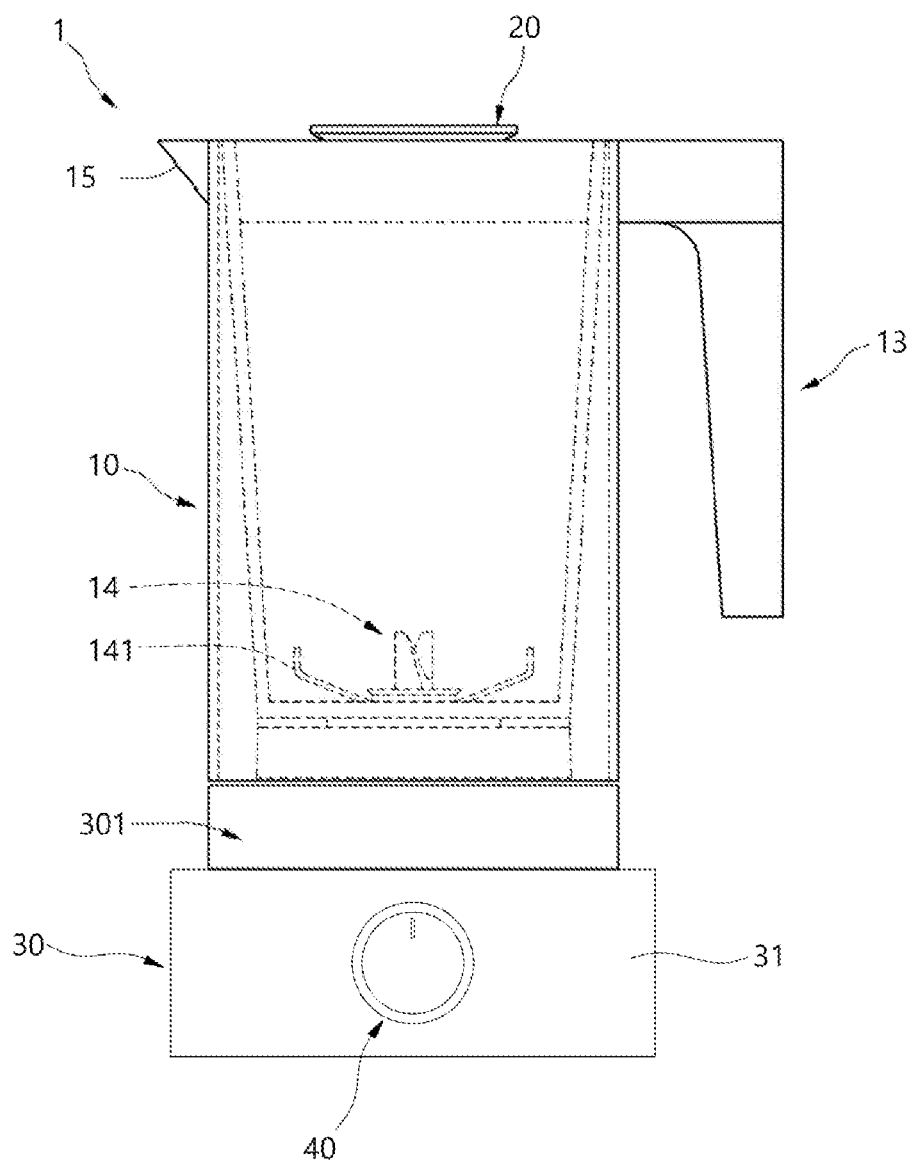
FIG. 2 is a front view of the blender.
Figure 3:
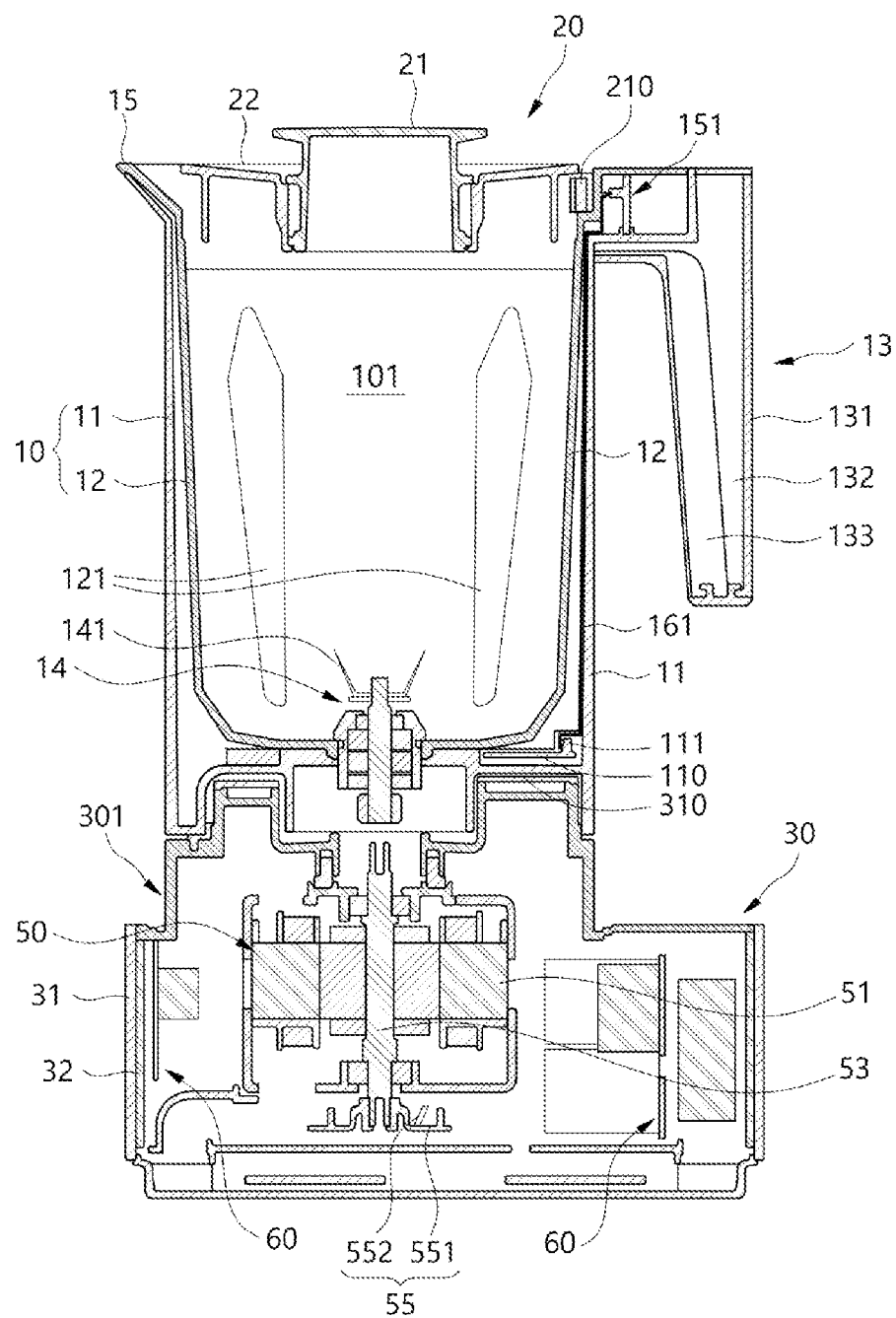
FIG. 3 is a vertical sectional view of the blender.

FIG. 1 is a perspective view of an exterior of a blender according to an embodiment of the present disclosure, FIG. 2 is a front view of the blender, and the blender, and FIG. 3 is a vertical sectional view of the blender.

Referring to the drawings, the blender 1 according to the embodiment of the present disclosure may include a main body 30 disposed on a foundation surface, and a container body 10 seated on the upper part of the main body 30.

A motor assembly 50 for operating the blender 1, electrical devices including a control PCB module 60, and components may be disposed inside the main body 30.

The main body 30 may be provided with a manipulation part 40 and 310b for manipulating the operation of the blender 1, and a display part 310a for displaying the operation thereof.

The main body 30 may be configured to have a hexahedral shape as a whole, and a seating part 301 may be provided on the upper surface of the main body 30 so as to seat the container body 10 on the seating part 301. The seating part 301 may be configured such that the container body 10 is attached to and detached from the seating part 301 in a vertical direction.

The exterior of the main body 30 may be constituted by an outer casing 31 which is made of metal or has a metal texture, and the outer casing 31 may be configured to have a hexahedral shape having an open lower surface.

An inner casing 32 may be formed in the outer casing 31, and space in which the motor assembly 50 and the control PCB module 60 are mounted may be defined inside the inner casing 32.

A knob 40 may be provided on the front surface of the main body 30 such that a user sets the operation of the blender 1. The knob 40 may protrude from the front surface of the main body 30 and may manipulate and set the operation of the blender 1 by being rotated.

The display part 310a may be provided on the upper surface of the main body 30 so as to display the operation state of the blender 1. The display part 310a may be configured as at least one seven-segment display.

A touch manipulation part 310b may be provided on the upper surface of the main body 30 such that the start or stop of the operation of the blender 1 can be manipulated. In order to manipulate the blender 1, the manipulation part 40 and 310b may include at least any one of the knob 40 and a touch module (not shown).

The seating part 301 may be formed on the upper surface of the main body 30. The seating part 301 may protrude from the upper surface of the main body 30, and a portion of the seating part 301 may be inserted into the lower surface of the container body 10 so as to stably support the container body 10.

When the container body 10 is seated on the seating part 301, the motor assembly 50 may be coupled to a blade module 14 provided in the container body 10 and may transmit a rotational force to the blade module 14.

The seating part 301 may have an appearance formed of the same material as the outer casing 31. The seating part 301 may be formed of a metal material or a material having a metal texture to have a sense of unity with the appearance of the main body 30 as a whole.

The motor assembly 50 may be mounted inside the main body 30 located under the seating part 301. The motor assembly 50 is intended to rotate the blade module 14 installed inside the container body 10, and may drive a motor in the motor assembly 50 to rotate the blade module 14 at high speed.

The motor assembly 50 may control the rotation speed of the motor according to the manipulation of the knob 40 such that the rotation speed of the blade module 14 can be controlled.

A first coil PCB module 310 may be disposed on a first side of the upper surface of the seating part 301. The first coil PCB module 310 may include a first PCB substrate on which a first induction coil is patterned by being wound multiple times. The first coil PCB module 310 may be connected to the control PCB module 60 and may receive power from the control PCB module 60.

The first PCB substrate may be attached to and detached from the main body 30. The attachment and detachment of the first PCB substrate may be enabled by the attachment and detachment of the first coil PCB module 310.

Additionally, the first PCB substrate and the first induction coil may also be replaced by replacing the first coil PCB module 310.

The motor assembly 50 may include a motor therein. The upper end of the motor assembly 50 may be connected to the blade module 14 located at the lower end of the container body 10, and a cooling fan 55 may be provided on the lower end of the motor assembly 50.

The cooling fan 55 may be configured such that multiple fan blades 552 are radially disposed on the upper surface of a fan plate 551 having a shape of a plate, and during the operation of the motor assembly 50, may rotate simultaneously with the blade module 14 such that cold air introduced in the axial direction of the cooling fan 55 is radially discharged, so the flow of the cold air in the main body 30 may be effectively forced.

Multiple control PCB modules 60 may be disposed on the inner wall surface of the inner casing 32 constituting the inner side surface of the main body 30. The control PCB module 60 may include multiple control PCB modules, and the multiple control PCB modules may be disposed on the circumference of the inner side surface of the main body 30, that is, on the front, rear, left, and right surfaces thereof, respectively.

The control PCB module 60 may include multiple controllers (not shown) capable of controlling the operation of the main body 30 and the container body 10. These controllers may be provided by mounting a MYCOM (a microprocessor) to a PCB substrate in the form of an on-chip, and may include a program and software necessary for controlling the main body 30 and the container body 10.

The container body 10 may be configured as a cylindrical shape corresponding to the outer diameter of the seating part 301, and may have an open upper surface, so the container body may have space therein in which food is received.

The container body 10 may be formed of a transparent material such as glass or materials like glass through which the inner portion of the container body 10 can be seen.

The container body 10 may have the blade module 14 provided at the center of the inner lower surface thereof. The blade module 14 may include multiple blades 141 and may be connected to the motor assembly 50. Accordingly, when the motor assembly 50 operates in a state in which the container body 10 is seated on the main body 30, the blades 141 may rotate and grind or cut food contained inside the container body 10.

Multiple inner guides 121 may be provided in the container body 10 to guide food that is rotated. Each of the inner guides 121 may extend by a predetermined length upward from the lower end of the inner side surface of the container body 10.

Meanwhile, a second coil PCB module 110 may be disposed on a side of the lower end of the container body 10. The second coil PCB module 110 may include a second PCB substrate on which a second induction coil is patterned by being wound multiple times.

The second coil PCB module 110 may be disposed at a position vertically corresponding to the first coil PCB module 310. Particularly, the first induction coil and the second induction coil may be preferably disposed at positions opposite to each other.

The second PCB substrate may be attached to and detached from the container body 10. The attachment and detachment of such a second PCB substrate may be enabled by the attachment and detachment of the second coil PCB module 110.

Furthermore, the second PCB substrate and the second induction coil may also be replaced by replacing the second coil PCB module 110.

A spout 15 through which crushed food is poured may protrude from the upper end of the container body 10, and a handle 13 may be provided at a side facing the spout 15 by protruding therefrom.

The handle 13 may protrude from the upper end of the container body 10 to the outside and then may extend downward such that a user can lift or carry the container body 10. The protruding end portion of the handle 13 may be located on the same extension line as the side end of the main body 30.

A detection module 151 configured to detect the closure of a container lid 20 may be installed on the inner side of the container body 10 to which the handle 13 is coupled. The detection module 151 may be embodied as a PCB substrate, and may include a switch.

The detection module 151 may detect the closure of the container lid 20 in such a manner that the switch provided therein operates according to the closure of the container lid 20, and may determine whether to perform inductive coupling between the first and second coil PCB modules 310 and 110.

That is, when the detection module 151 detects the closure of the container lid 20 of the container body 10, current transmission between the first and second coil PCB modules 310 and 110 may be performed, but when the detection module 151 does not detect the closure of the container lid 20, current transmission between the first and second coil PCB modules 310 and 110 may not be performed.

The detection module 151 and the second coil PCB module 110 may be electrically connected to each other by a conductive member 161. The conductive member 161 may be installed between an outer container body 11 and an inner container body 12.

The conductive member 161 may be electrically connected to the detection module 151 in a first end thereof, and may be electrically connected to the second coil PCB module 110 in a second end thereof by extending from the upper end of the container body 10 to the lower end thereof.

The detection module 151 and the second coil PCB module 110 may be provided with first and second connectors 152 and 111, respectively, for effective electrical connection to the conductive member 161. By using the first and second connectors 152 and 111, the detection module 151 and the second coil PCB module 110 may be easily attached to and detached from the conductive member 161. Accordingly, the detection module 151, the second coil PCB module 110, and the conductive member 161 may be more easily attached to and detached from the blender 1, and replacement thereof may also be easy.

The conductive member 161 may be in contact with the inner or outer surface of the container body 10. When being in contact with the outer surface, the conductive member 161 may be coated with a predetermined coating material to be fixedly attached to the outer surface.

The conductive member 161 may be formed of a transparent material such that the design of the container body 10 of the transparent material can be maintained.

The blender 1 according to the embodiment of the present disclosure may include the container lid 20.

The container lid 20 may shield the open upper surface of the container body 10, and a user may open the open upper surface of the container body 10 by separating the container lid 20 from the container body 10.

The open upper surface of the container body 10 may be closed (referred to as the closure of a container lid) or opened (referred to as the opening of the container lid) by the container lid 20 such that the open upper surface of the container body 10 may be closed and opened.

The container lid 20 may include a container lid handle 21.

A triggering member 210 turning on/off the switch of the detection module 151 may be arranged on the inner surface of a side of the container lid 20. When the triggering member 210 approaches the detection module 151 within a predetermined distance, the switch provided in the detection module 151 may be turned on. Contrarily, when the triggering member 210 moves away from the predetermined distance, the switch may be turned off.

Meanwhile, as described above, the blender 1 according to the embodiment of the present disclosure may be operated by the manipulation of the knob 40 and the touch manipulation part 310b, but may be configured to be selectively operated only under a specific condition.

For example, the blender 1 according to the embodiment may be operated only in the state in which the container lid 20 closes the container body 10, that is, in the state of the closure of the container lid. This is because when the blender 1 operates in the open state of the container lid, accidents may occur due to the blades 141, which are sharp, and food contained in the container body 10 may be ejected to the outside.

Figure 4:
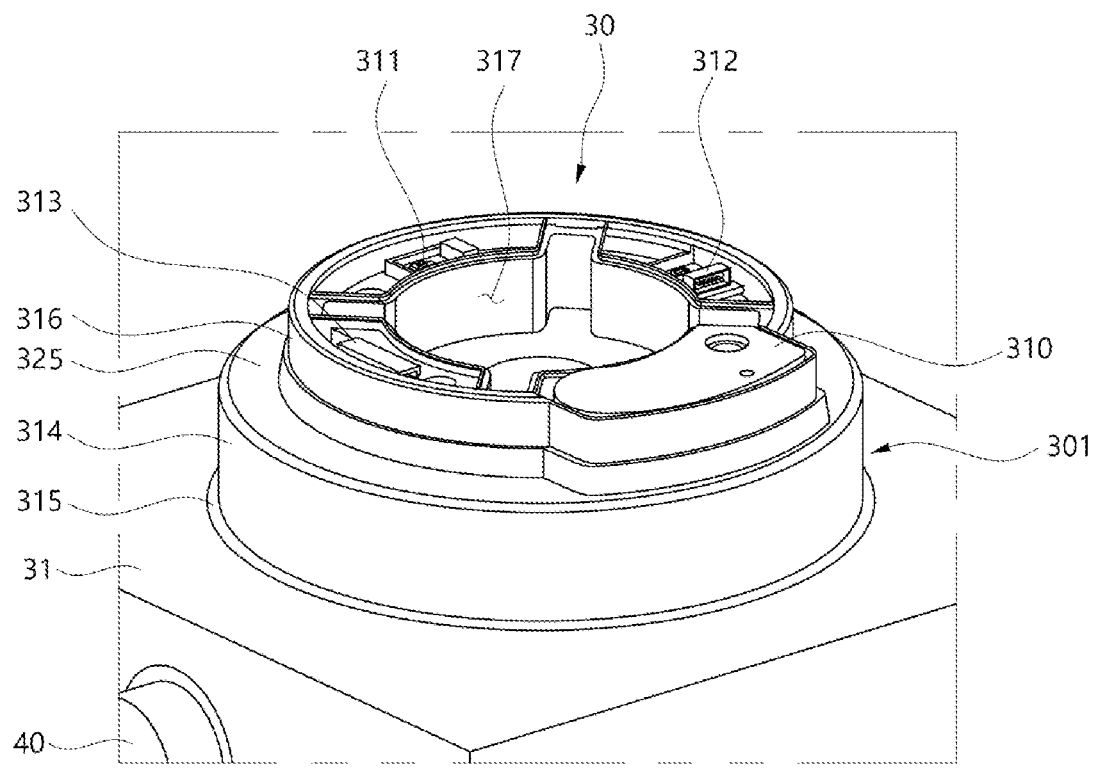
FIG. 4 is a perspective view of a main body which is a component of the blender according to the embodiment of the present disclosure.
Figure 5:
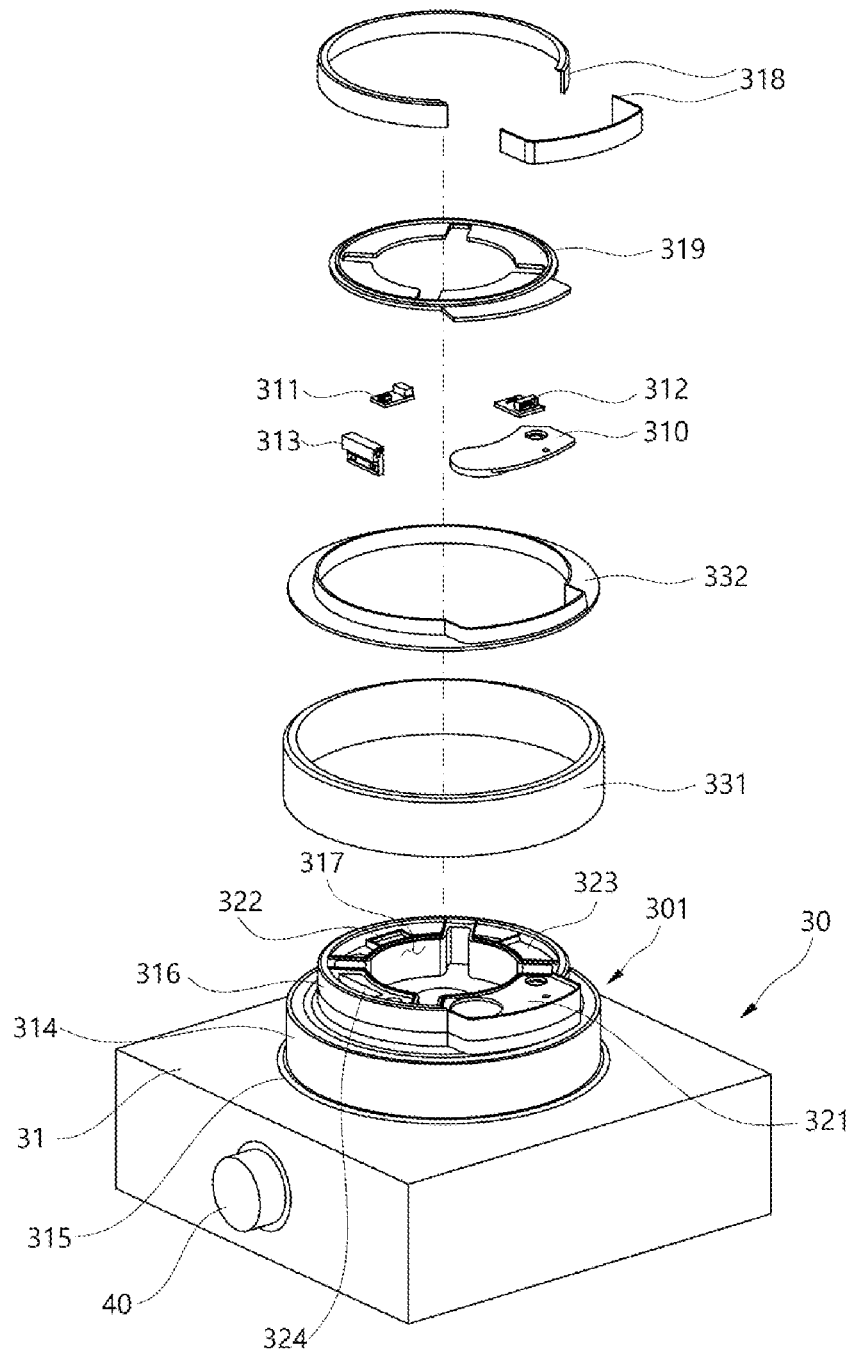
FIG. 5 is an exploded perspective view of the main body.

FIG. 4 is a perspective view of the main body which is a component of the blender according to the embodiment of the present disclosure, and FIG. 5 is an exploded perspective view of the main body.

Referring to the drawings, the main body 30 according to the embodiment of the present disclosure may be configured to have a cuboid shape, and may have a structure in which the seating part 301 protrudes on the upper surface of the main body 30 to seat the container body 10 thereon, and the knob 40 by which the operation of the blender 1 is controlled is disposed on the front surface of the main body 30.

As for the overall structure of the main body 30, the outer casing 31 may be mounted to the outer side of the main body 30 to constitute the exterior of the main body 30. The outer casing 31 may be formed of a metal material such as stainless steel and may be formed of materials having plate shapes, which are bent and joined to each other, thereby providing the shape of a very clean and rigid appearance.

The seating part 301 may have a two-step shape, and an entire appearance thereof may be constituted by a first seating part decoration 314, a second seating part decoration 316, and a lower decoration 315.

The first seating part decoration 314 and the second seating part decoration 316 may be formed of the same material as the outer casing 31 or of a material having the same texture as the outer casing 31.

The lower decoration 315 may be formed of a plastic or rubber material, and may be formed in a ring shape. In addition, during the mounting of the first seating part decoration 314, the lower part 315 may fill space between the first seating part decoration 314 and the outer casing 31 such that no gap is visible.

A first exterior material 331 may be mounted to the circumference of the side surface of the first seating part decoration 314. Such a first exterior material 331 may be formed of a stainless material and may protect the first seating part decoration 314.

The first seating part decoration 314 and the second seating part decoration 316 may have predetermined heights and may be formed in ring shapes as a whole when viewed from the top. The second seating part decoration 316 may have a smaller diameter than the first seating part decoration 314, and may be disposed at the center of the first seating part decoration 314.

A seating packing 332 may be disposed at the outskirt of the second seating part 316 arranged at the center of the upper surface 325 of the first seating part 314. The seating packing 332 is intended to give a sense of stability when the container body 10 is seated on the seating part 301, and may be formed of, for example, a rubber material or a silicone material.

The second seating part decoration 316 may have a circular shape as a whole when seen from the top and may be configured to have a portion protruding laterally.

An insertion space 317 may be defined in the center portion of the upper surface of the second seating part decoration 316, and a first seating groove 321 and a second seating groove 322 may be formed on the circumference of the upper surface of the second seating part decoration 316. A third seating groove 323 and a fourth seating groove 324 may be selectively formed on the upper surface of the second seating part decoration 316.

The first coil PCB module 310 may be seated in the first seating groove 321. A photosensor 311 may be seated in the second seating groove 322. A Hall sensor 312 may be selectively seated in the third seating groove 323 so as to detect the type of the container body 10 seated on the main body 30, and a reed switch 313 may be seated in the fourth seating groove 324 so as to detect whether the container body 10 is seated.

The first coil PCB module 310, the photosensor 311, the Hall sensor 312, and the reed switch 313 may be attached to and detached from the first, second, third, and fourth seating grooves 321, 322, 323, and 324, respectively.

When the container body 10 is seated on the main body 30, the Hall sensor 312 may detect a magnet (not shown) attached to the lower part of the container body 10 according to the type of the container body 10 and may detect the type of the container body 10. The magnitude of the magnetic force of a magnet may be different for each type of the container body 10, and accordingly, the type of the container body 10 may be detected by using the magnitude of a magnetic force detected by the Hall sensor 312.

When the container body 10 is seated on the main body 30, the reed switch 313 may detect a magnet (not shown) mounted to the lower part of the container body 10 and may detect whether the container body 10 is seated. When the magnet approaches the reed switch 313, the reed switch 313 may be turned on to detect the approaching of the magnet, and through the detection of the approaching of the magnet, the seating of the container body 10 may be detected.

While the first coil PCB module 310 and the photosensor 311 are seated, and while the Hall sensor 312 and the reed switch 313 are selectively seated, a cover 114 may be coupled to the upper part of the second seating part decoration 316.

The cover 114 may hold and protect the first coil PCB module 310, the photosensor 311, the Hall sensor 312, and the reed switch 313, and may be formed of a material having a magnetic field penetration function such that the photosensor 311 or the Hall sensor 312 can sense light or a magnetic field through the cover 114.

While the cover 114 is coupled to the second seating part decoration 316, a second exterior material 318 may be mounted to the circumference of each of the side surfaces of the cover 114 and the second seating part decoration 316.

Figure 6:
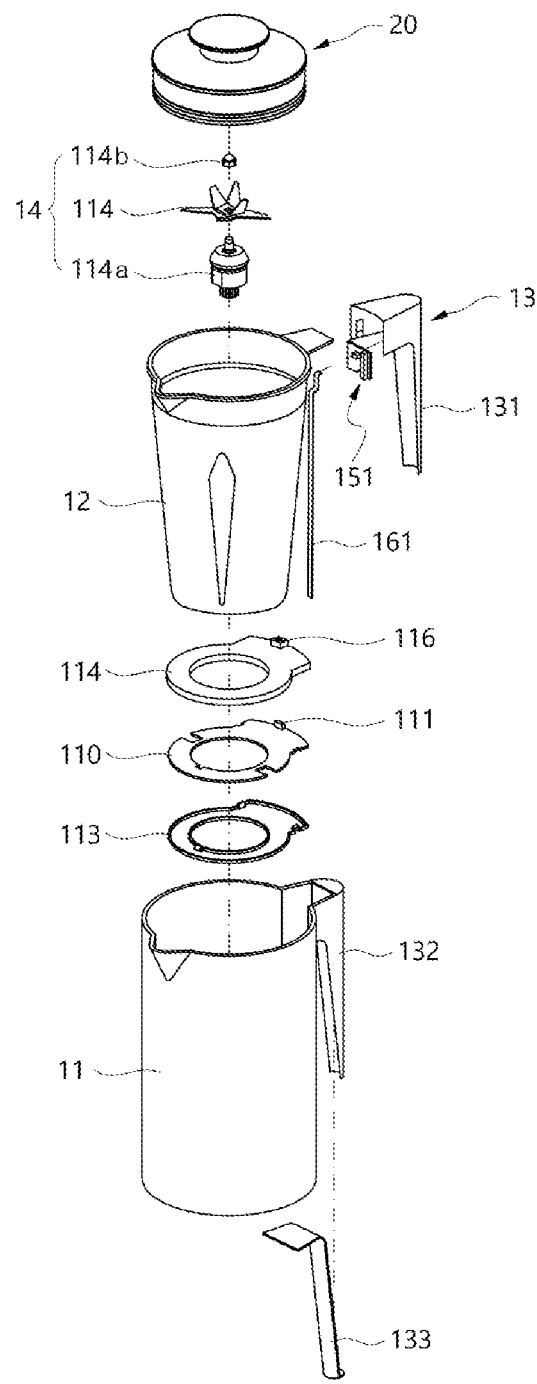
FIG. 6 is an exploded perspective view of a container body which is a component of the blender according to the present disclosure.
Figure 7:
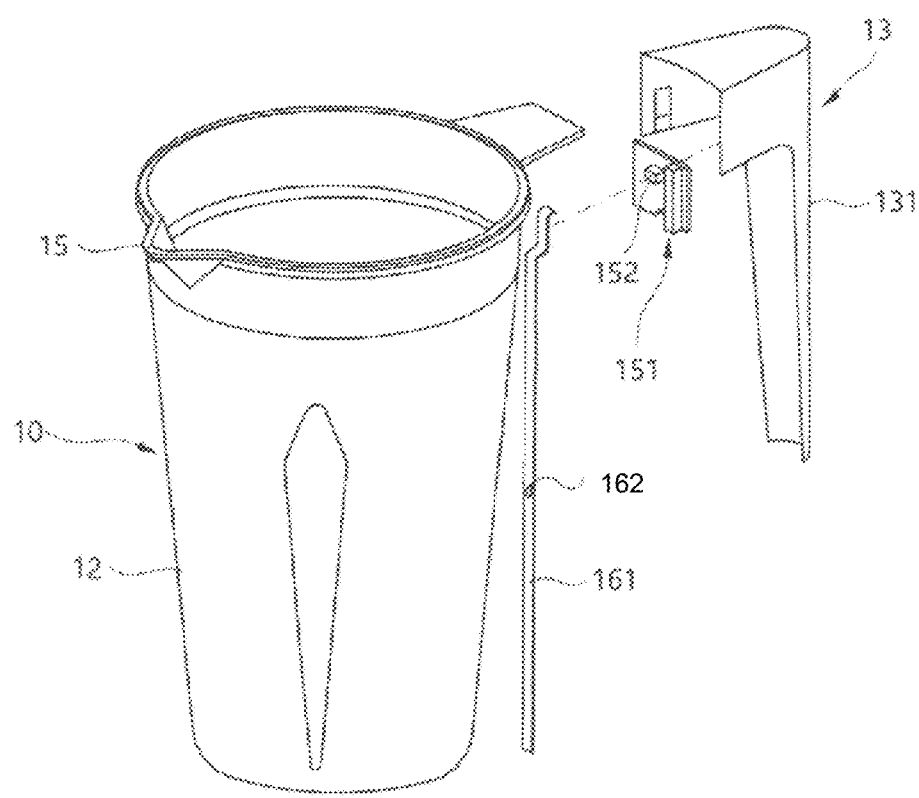
FIG. 7 is a perspective view of an inner container body according to the present disclosure seen at a different angle.
Figure 8:
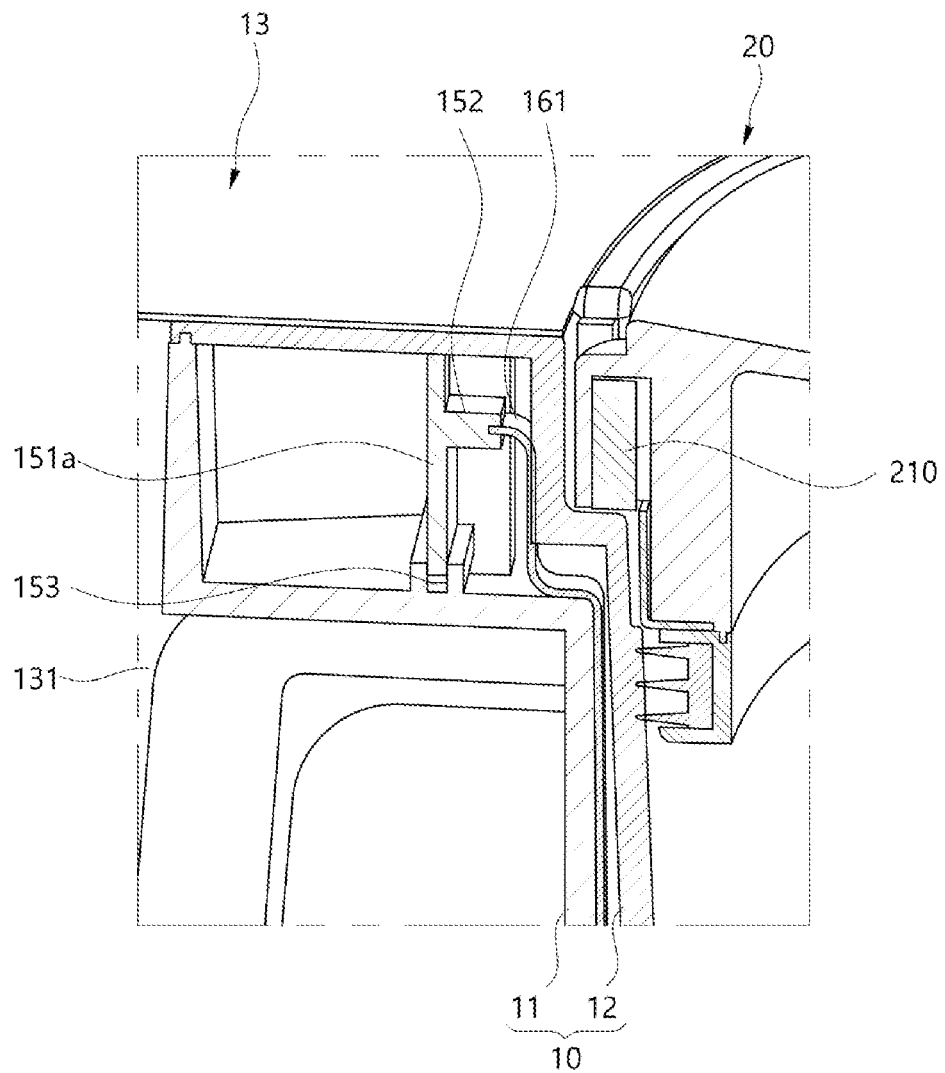
FIG. 8 is a detailed view of a detection module of the container body.
Figure 9:
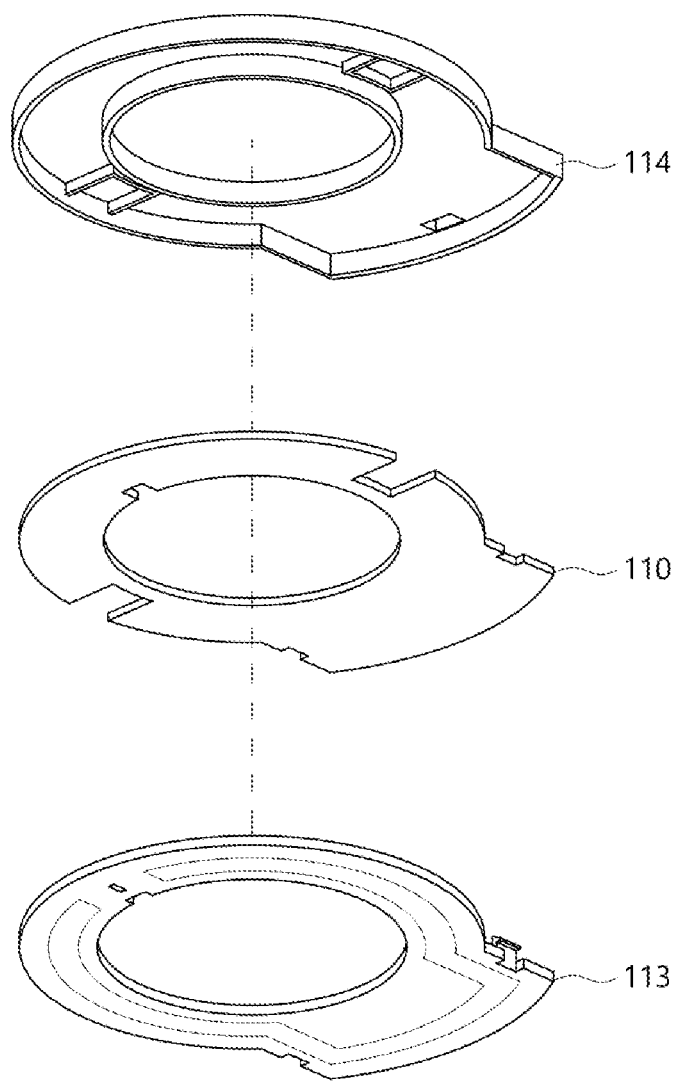
FIG. 9 is an exploded perspective view of a second coil PCB module of the container body seen from a lower side thereof.

FIG. 6 is an exploded perspective view of the container body which is a component of the blender according to the embodiment of the present disclosure, FIG. 7 is a perspective view illustrating the coupled structure of the inner container body and a handle cover seen at a different angle, FIG. 8 is a detailed view of the detection module of the container body, and FIG. 9 is an exploded perspective view of the second coil PCB module of the container body seen from a lower side thereof.

Referring to the drawings, the container body 10 according to the embodiment may be configured in a cylindrical shape having the open upper surface. The blade module 14 may be mounted to the lower surface of the container body 10, and the container lid 20 may be detachably mounted to the open upper surface of the container body 10.

The container body 10 may be formed of a material such as glass, Tritan, or transparent plastic, etc. to check the state of food therein during the operation of the blender 1.

The container body 10 may include the outer container body 11 constituting an outer shape thereof, and the inner container body 12 having inner space in which food is received.

The inner container body 12 and the outer container body 11 may be coupled to each other and may constitute the overall shape of the container body 10 such that the container body 10 has a double wall structure.

The inner container body 12 may be spaced apart from the outer container body 11, which may define space between the outer container body 11 and the inner container body 12. The inner container body 12 may have a diameter decreasing gradually downward. The lower part of the inner container body 12 may be configured to be inclined or round toward the blade module 14 such that food in the container body 10 may be directed to the blade module 14.

The outer container body 11 may have a cylindrical shape having upper and lower ends which have the same outer diameters, respectively, such that the appearance of the container body 10 looks neat.

The outer diameter of the outer container body 11 may be configured to be the same as the outer diameter of the seating part 301, and while the container body 10 is mounted to the main body 30, the main body 30 and the container body 10 may be seen as being integrated with each other.

A receiving part (not shown) of the main body may be formed on the lower surface of the outer container body 11. The receiving part 102 of the main body may have space recessed upward from the lower surface of the outer container body 11 such that the second seating part decoration 316 described above can be inserted into the space. Due to the coupling of the receiving part 102 of the main body to the second seating part decoration 316, the state of the container body 10 mounted to the seating part 301 may be maintained.

A middle handle 132 may be formed at a side of the upper end of the outer container body 11 by protruding therefrom. When the middle handle 132 is formed by protruding, an inner space may be defined at the side of the upper end of the outer container body 11 to receive the detection module 151.

An outer handle 131 may be coupled to the outer side of the middle handle 132, and an inner handle 133 may be coupled to the inner side of the middle handle 132 so as to constitute the handle 13 as a whole.

The upper end of the inner container body 12 may be configured to have an inclined surface 122 having an inner diameter decreasing gradually downward. Accordingly, in a process in which the container lid 20 is inserted to the open upper surface of the container body 10, the container lid 20 may be configured to seal the inner container body 12 while being gradually brought into close contact with the inner container body 12.

The upper inclined surface of the inner container body 12 may be configured from the upper end of the container body 10 to the upper end of the inner guide 121, and may be configured along the circumference of the inner surface of the container body 10.

The inner guide 121 may be formed on the inner side surface of the inner container body 12. The inner guide 121 may extend from the inclined surface 122 to the bottom surface of the inner container body 12.

The second coil PCB module 110 may be disposed on the lower part of the inner container body 12. As described above, the second coil PCB module 110 may be embodied with the second induction coil 201 patterned on the PCB substrate. The second induction coil 201 may be wound multiple times on the PCB substrate in a spiral shape relative to a center point 201a.

The second coil PCB module 110 may be fixedly mounted to a lower plate 113, and while the second coil PCB module 110 is fixedly mounted to the lower plate 113, the cover 114 may be coupled to the lower plate 113.

In addition, the second connector 111 may be installed at a side of the upper surface of the second coil PCB module 110 by protruding therefrom to electrically connect the second induction coil 201 with the conductive member 161.

A receiving part 116 having an open upper surface may be installed on the upper surface of the cover 114 by protruding therefrom to receive the second connector 111 from a position under the cover 114, and the conductive member 161 may be coupled to the second connector 111 exposed through the receiving part 116 to be electrically connected to the second coil PCB module 110.

The detection module 151 may be installed on the inner side of the upper end portion of the container body 10 to which the handle 13 is coupled. The detection module 151 may be embodied as a PCB and may include a switch which can be turned on/off as described later. Such a switch may be switched on only under a specific condition.

The detection module 151 may detect whether the container lid 20 closes the container body 10. Specifically, when the container lid 20 closes the container body 10, the switch located inside the detection module 151 may be turned on by the triggering member 210 installed inside the container lid 2.

Accordingly, in the embodiment, when the switch in the detection module 151 is turned on, the detection module 151 may detect the closure of the container lid 20.

The detection module 151 may be seated in a groove 153 formed thereunder and may maintain stability thereof. The first connector 152 may be mounted to the detection module 151 such that the detection module 151 is electrically connected with the conductive member 161.

The conductive member 161 may be disposed between the outer container body 11 and the inner container body 12. The conductive member 161 may be disposed by extending in the longitudinal direction of the container body 10 from the upper part of the container body 10 to the lower part thereof.

The conductive member 161 may be formed of a transparent material to secure and maintain the transparency of the outer container body 11 and the inner container body 12 formed of a material such as glass, Tritan, or transparent plastic, etc. In the embodiment, the conductive member 161 may include a transparent electrode film (ITO).

The first end of the conductive member 161 may be electrically connected to the detection module 151 by the first connector 152, and the second end of the conductive member 161 may be electrically connected to the second coil PCB module 110 by the second connector 111.

Specifically, the first end of the conductive member 161 may be connected to the switch provided in the detection module 151, and the second end of the conductive member 161 may be connected to the second induction coil 201 provided in the second coil PCB module 110.

In this case, the transparent electrode film may be configured to have a curved surface in a section. That is, the transparent electrode film may bend at about 90 degrees to be connected to the detection module 151. The angle of the curved surface may be changed according to the position of the detection module 151.

The conductive member 161 may be in contact with the inner surface of the outer container body 11 or with the outer surface of the inner container body 12 and may extend from the upper part of the container body to the lower part thereof. In this case, when the transparent electrode film is in contact with the inner surface of the outer container body 11 or the outer surface of the inner container body 12, a hole 162 may be formed in at least a portion of the transparent electrode film. This is intended such that air bubbles which may occur when the transparent electrode film is in contact with the inner surface of the outer container body 11 or the outer surface of the inner container body 12 can escape through the hole 162. To this end, the center portion of the transparent electrode film may be perforated to remove air bubbles.

The upper end part of the conductive member 161 may be installed by bending in a section according to the shapes of the outer container body 11 and the inner container body 12.

In the embodiment, the conductive member 161 may be made of a transparent material. Accordingly, when seeing the container body 10 from the outside, the transparency of the entirety of the container body 10 made of a transparent material may be maintained without being impaired.

The triggering member 210 may be mounted to the inside of a side surface of the container lid 20 such that the triggering member 210 is located at a position corresponding to the detection module 151. When the container lid 20 closes the container body 10, the triggering member 210 may be installed to approach the detection module 151 within a predetermined distance.

When the triggering member 210 approaches the detection module 151 within a predetermined distance, the switch of the detection module 151 may be turned on.

Specifically, when the container lid 20 closes the container body 10, the triggering member 210 installed inside the container lid 20 may approach the detection module 151 within a predetermined distance, and the switch of the detection module 151 may be turned on. When the container lid 20 is opened, the triggering member 210 of the container lid 20 may move away by a predetermined distance from the detection module 151 and the switch of the detection module 151 may be turned off.

Figure 10:
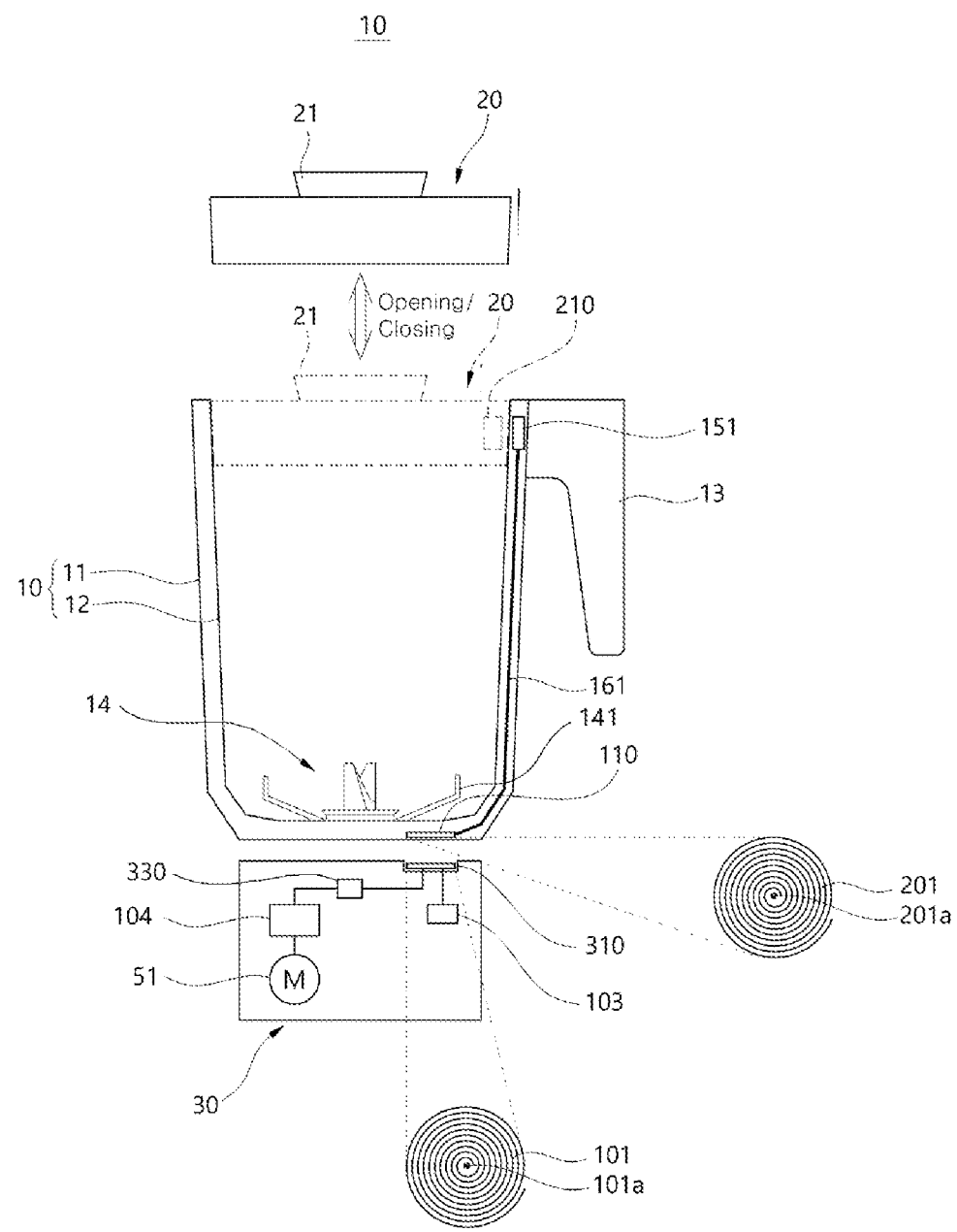
FIG. 10 is a view schematically illustrating the configuration of a portion of the blender according to the embodiment of the present disclosure.
Figure 11:
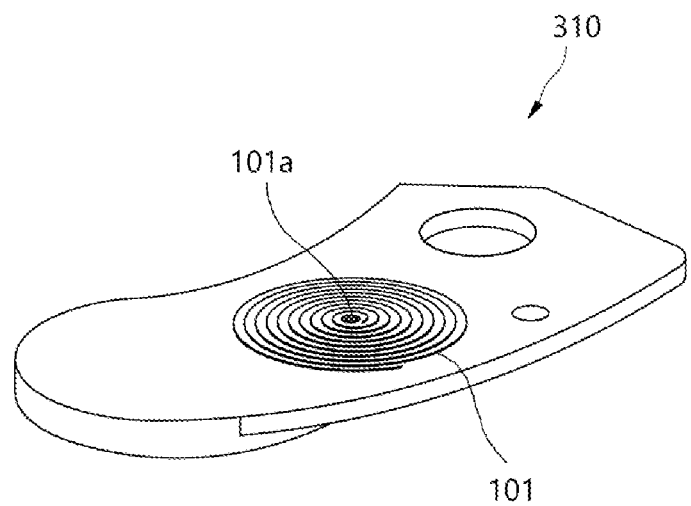
FIG. 11 is a detailed view of the upper surface of a first coil PCB module of the main body.
Figure 12:
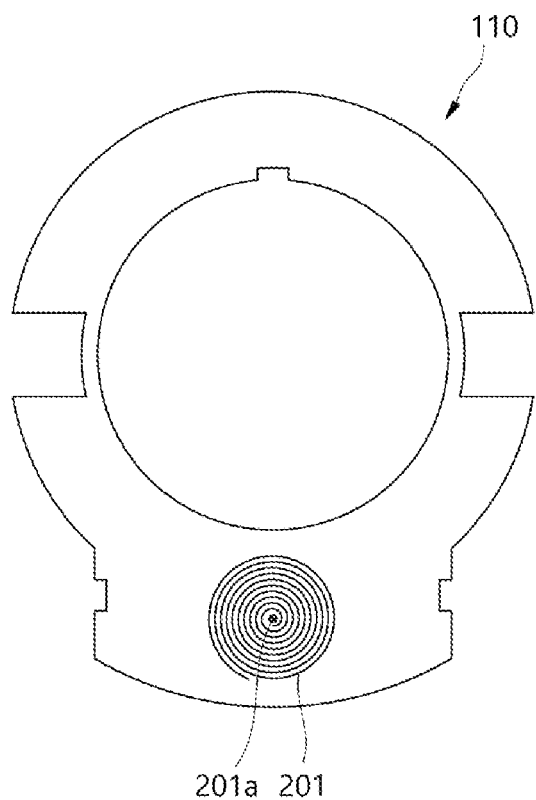
FIG. 12 is a detailed view of the lower surface of the second coil PCB module of the container body.
Figure 13:
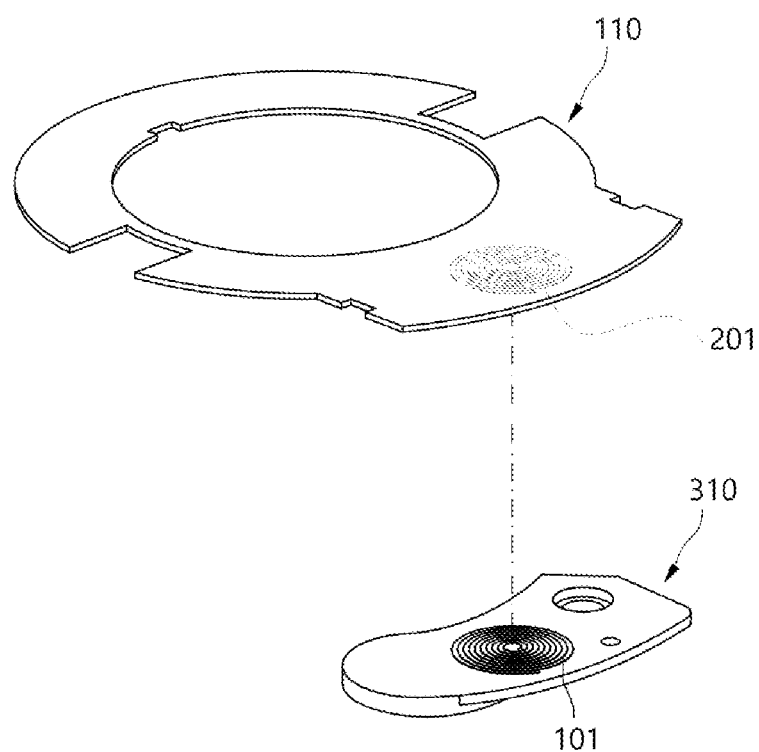
FIG. 13 is a view schematically illustrating arrangement between the first and second coil PCB modules.

FIG. 10 is a partial cross sectional view schematically illustrating the configuration of a portion of the blender according to the embodiment of the present disclosure, FIG. 11 is a detailed view of the upper surface of the first coil PCB module of the main body, FIG. 12 is a detailed view of the lower surface of the second coil PCB module of the container body, and FIG. 13 is a view schematically illustrating arrangement between the first and second coil PCB modules.

Referring to the drawings, the first coil PCB module 310 may be installed at a first side of the upper part of the main body 30 of the blender 1 according to the embodiment of the present disclosure.

The first coil PCB module 310 may be embodied with the first induction coil 101 patterned on a PCB substrate. The first induction coil 101 may be wound multiple times on the PCB substrate in a spiral shape relative to a center point 101*a*.

The main body 30 may include a power supply part 103 therein. The power supply part 103 may apply current to the first induction coil 101. When the current is applied to the first induction coil 101, a magnetic field may be generated in the first induction coil 101.

The power supply part 103 may be mounted to the first coil PCB module 310, or to the control PCB module 60.

The power supply part 103 may change the intensity of the current applied to the first induction coil 101, and the intensity of the magnetic field of the first induction coil 101 may be changed by the change of the intensity of the current.

The main body 30 may include a current detection part 330 for detecting current of the first induction coil 101. The current detection part 330 may be mounted to the first coil PCB module 310.

The main body 30 may include the controller 104 provided therein. The controller 104 may be connected to the current detection part 330 and the motor assembly 50 described above, and may drive the motor 51 of the motor assembly 50 by using the current of the first induction coil 101 detected by the current detection part 330. Specifically, when current detected by the current detection part 330 changes, the controller 104 may drive the motor 51. The controller 104 may be mounted to the control PCB module 60 or the first coil PCB module 310 described above.

The second coil PCB module 110 may be installed at a side of the lower surface of the container body 10.

The second coil PCB module 110 may be embodied with the second induction coil 201 patterned on a PCB substrate. The second induction coil 201 may be wound multiple times on the PCB substrate in a spiral shape relative to the center point 201*a*.

Like the embodiment illustrated in the drawing, when the container body 10 is seated on the main body 30, the first induction coil 101 of the main body 30 and the second induction coil 201 of the container body 10 may be disposed at a predetermined interval at positions corresponding to each other.

Specifically, when the container body 10 is seated on the main body 30, the first induction coil 101 and the second induction coil 201 may be concentric in the two center points 101*a* and 201*a*, respectively, and may be disposed to be parallel to each other by facing each other.

Inductive coupling between the first induction coil 101 and the second induction coil 201 may be selectively performed under a specific condition.

When the intensity of current applied to the first induction coil 101 changes, a magnetic field of the first induction coil 101 may be changed, and a magnetic flux passing through the second induction coil 201 may be changed due to the inductive coupling between the first induction coil 101 and the second induction coil 201, so an induced electromotive force may be generated in the second induction coil 201.

The positions and arrangement of the first and second induction coils 101 and 201 may be determined such that the inductive coupling is effectively performed therebetween.

As described above, when a voltage is induced in the second induction coil 201 due to inductive coupling between the first and second induction coils, a magnetic field may be generated in the surrounding area of the second induction coil 201. Such a magnetic field may affect the current of the first induction coil 101.

A current applied to the first induction coil 101 by the power supply part 103 may be different from a current of the first induction coil 101 when a magnetic field generated in the second induction coil 201 due to a voltage induced in the second induction coil 201 by the inductive coupling affects the first induction coil 101.

This is caused by the impact of the magnetic field of the second induction coil 201 on the first induction coil 101, and the change of the electrical characteristics of the first induction coil 101 may cause the change of the current of the first induction coil 101.

Accordingly, in the embodiment, when the current detection part 330 detects the current of the first induction coil 101, the controller 104 may check whether the change of the detected current occurs, and when the change of the detected current occurs, the controller 104 may determine that inductive coupling between the first and second induction coils 101 and 201 is performed.

The detection module 151 may be mounted to the upper end part of the container body 10. In the embodiment, in the upper end part the container body 10, the detection module 151 may be mounted between the outer container body 11 and the inner container body 12. The detection module 151 may be embodied with the switch 151a to be described later mounted to a PCB substrate.

The triggering member 210 may be mounted on a side of the side surface of the container lid 20. When the container lid 20 closes the container body 10, the triggering member 210 may be disposed to approach the detection module 151 located substantially at the same height as the triggering member 210 within a predetermined distance.

When the container lid 20 closes the container body 10, the triggering member 210 of the container lid 20 may approach the detection module 151 within a predetermined distance, and the switch 151a of the detection module 151 may be turned on. Accordingly, the detection module 151 may function to detect the closure of the container lid.

In the embodiment, the triggering member 210 may be a magnetic body, and the switch 151a may be a reed switch.

In the embodiment, the reed switch may be turned off in an initial stage, and when the magnetic body approaches the reed switch within a predetermined distance, the reed switch may be turned on.

The detection module 151 and the second coil PCB module 110 may be electrically connected to each other through the transparent conductive member 161. Specifically, the transparent conductive member 161 may electrically connect the switch 151a of the detection module 151 with the second induction coil 201 of the second coil PCB module 110.

The conductive member 161 may include a transparent electrode film (ITO). When the transparent electrode film ITO is made of a transparent material, the transparent electrode film may have characteristics capable of conducting current. In the embodiment, a reason in which the conductive member 161 is made of a transparent material like the transparent electrode film ITO is that when the conductive member 161 is disposed vertically on the container body 10 made of a transparent material, the transparency of the container body 10 can be maintained.

The transparent electrode film (ITO) may be installed at various positions. According to the embodiment, the transparent electrode film may be installed between the outer container body 11 and the inner container body 12. The transparent electrode film may be preferably attached to the inner surface of the outer container body 11 or on the outer surface of the inner container body 12.

For another example, the transparent electrode film (ITO) may be attached to the outer surface of the outer container body 11, and in this case, the transparent electrode film (ITO) may be coated with a transparent coating material such that the transparent electrode film is protected from the outside.

The transparent electrode film (ITO) may be disposed in the longitudinal direction of the container body 10 from the detection module 151 of the upper part of the container body 10 to the second coil PCB module 110 of the lower part of the container body 10. Accordingly, although the transparent electrode film (ITO) is disposed in the vertical longitudinal direction of the container body 10, the transparency of the container body 10 may be maintained.

Meanwhile, the second induction coil 201 and the switch 151a may be electrically connected in series to each other. A resistor may also be selectively added to the serial connection. Accordingly, according to the turn on/off of the switch 151a, power from the second induction coil 201 may be supplied and interrupted by the resistor.

Figure 14:
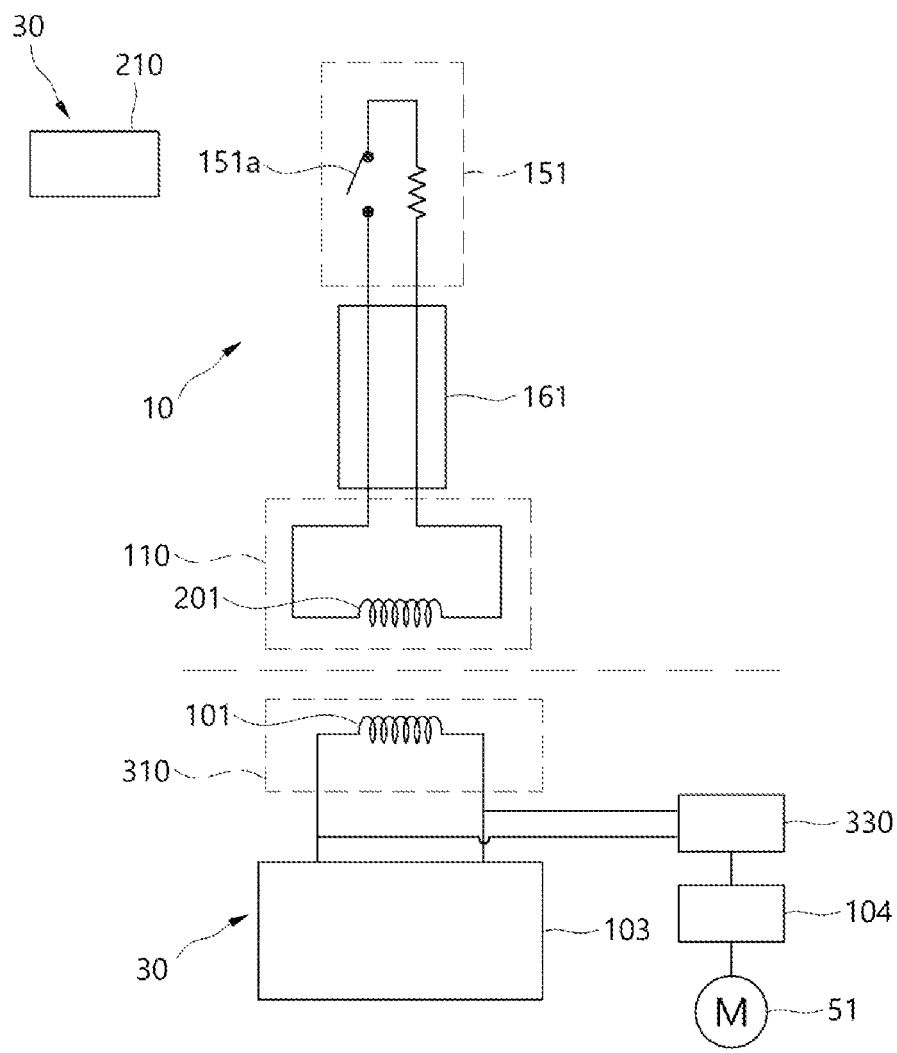
FIG. 14 is a view illustrating an example of an equivalent circuit diagram of the blender of FIG. 10.
Figure 15:
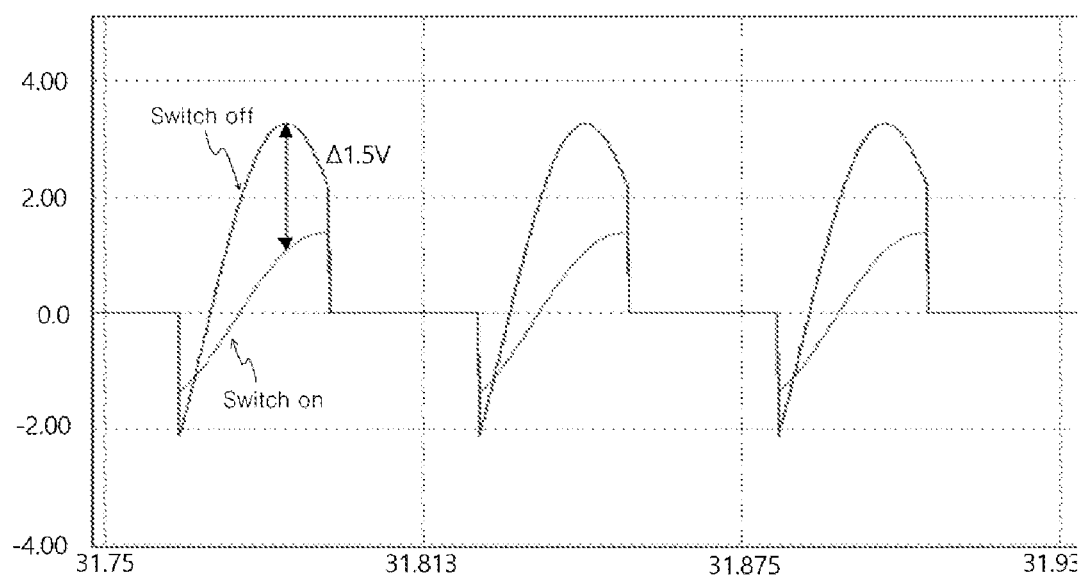
FIG. 15 is a graph illustrating the experimental result of the change of current detected by a current detection part of the main body in the blender of FIG. 10.

FIG. 14 is a view illustrating an example of an equivalent circuit diagram of the blender of FIG. 10, and FIG. 15 is a graph illustrating the experimental result of the change of current detected by the current detection part of the main body in the blender of FIG. 10.

Referring to the drawings, in the main body 30, the first induction coil 101 may be connected to the power supply part 103, and may be connected to the current detection part 330.

The current detection part 330 may be connected to the controller 104 and the motor 51.

The power supply part 103 may supply current to the first induction coil 101, and a magnetic field may be generated in the first induction coil 101 by the supplied current.

The power supply part 103 may control the intensity of current supplied to the first induction coil 101 and may induce the change of the magnetic field of the first induction coil 101.

In the container body 10, the second induction coil 201 may be connected to the detection module 151.

In the embodiment, the second induction coil 201 and the detection module 151 may be connected to each other by the conductive member 161 made of a transparent material.

The detection module 151 may include the switch 151a turned on/off under a specific condition. In the embodiment, such a switch 151a may include a reed switch.

The detection module 151 may further include a resistor connected in series to the switch 151a as needed.

Operation in such an equivalent circuit diagram will be described.

In a state in which the container lid 20 does not close the container body 10, the detection module 151 may not detect the triggering member 210, so the turn-off state of the switch 151a may be maintained.

In a state in which the switch 151a is turned off, the second induction coil 201 and the switch 151a may not form a closed circuit, so inductive coupling between the first induction coil 101 and the second induction coil 201 may not occur.

When the container lid 20 closes the container body 10, the triggering member 210 may approach the detection module 151 within a predetermined distance, and the switch 151*a* of the detection module 151 may be turned on by the triggering member 210.

When the switch 151*a* is turned on, the second induction coil 201 and the switch 151*a* connected in series to each other may form a closed circuit.

As described above, when the closed circuit is formed, inductive coupling between the first induction coil 101 and the second induction coil 201 may be performed, and a voltage may be induced in the second induction coil 201. Of course, in this case, current may be being applied from the power supply part 103 to the first induction coil 101.

In this case, the current detection part 330 may detect the current of the first induction coil 101 in real time and transmit the current to the controller 104. The controller 104 may check whether there is a change in the detected current. When there is a change in the detected current, the controller 104 may determine that the container lid 20 of the container body 10 is closed and may operate the motor 51.

Specifically, the current detection part 330 may detect current flowing in the first induction coil 101. In a state in which the container lid 20 does not close the container body 10, the switch 151*a* may be in a turn-off state, so the current detection part 330 may detect only current applied to the first induction coil 101 from the power supply part 103.

Next, when the container lid 20 closes the container body 10, the switch 151*a* may be in a turn-on state, and a voltage may be induced in the second induction coil 201 by inductive coupling between the first and second induction coils 101 and 201.

A magnetic field may be generated in the second induction coil 201 by the voltage induced in the second induction coil 201, and such a magnetic field may affect electrical characteristics of the first induction coil 101.

In this case, the impact of the magnetic field on the electrical characteristics of the first induction coil may be the change of current of the first induction coil 101, specifically, the change of the magnitude of the current thereof.

Accordingly, when the change of the current of the first induction coil 101 detected by the current detection part 330 is checked, the controller 104 may determine that the container lid 20 of the container body 10 is closed.

FIG. 15 illustrates the experimental result of the change of the current of the first induction coil 101 according to the opening/closing of the container lid 20 of the container body 10, that is, the turn on/off of the switch 151*a*.

Referring to the drawing, the magnitude of the current of the first induction coil when the switch 151*a* is turned on is 1.5V less than the magnitude of the current of the first induction coil when the switch 151*a* is turned off.

Accordingly, in the embodiment, the current of the first induction coil 101 in a state in which the container lid is opened and the current of the first induction coil 101 in a state in which the container lid is closed may be compared with each other, and when there is change therebetween, the controller 104 may operate the motor 51.

Accordingly, the blender 1 may operate only under the specific condition of the closure of the container lid.

Figure 16:
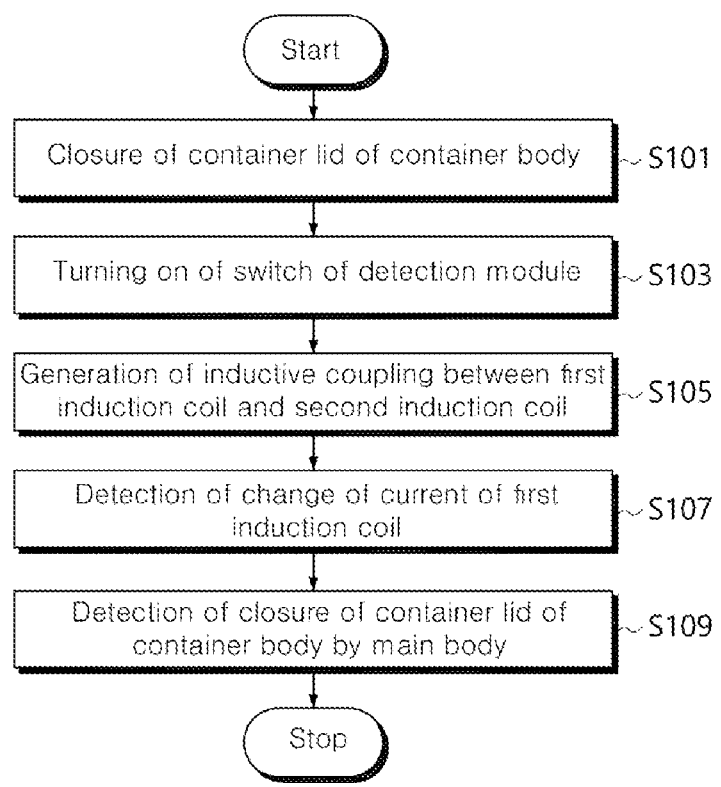
FIG. 16 is a flowchart illustrating a process in which the main body detects the closure of a container lid according to the embodiment of the present disclosure.

FIG. 16 is a flowchart illustrating a process in which the main body detects the closure of the container lid according to the embodiment of the present disclosure.

Referring to FIG. 16, in the embodiment, when the container lid 20 closes the container body 10 at S101, the switch 151*a* of the detection module 151 may be turned on by the triggering member 210 mounted inside a side surface of the upper end of the container lid 20 at S103.

As described above, when the switch 151*a* is turned on, the switch 151*a* and the second induction coil 201 may form a closed circuit, so inductive coupling between the first induction coil 101 and the second induction coil 201 may be performed at S105.

Power may be generated in the second induction coil 201 due to such inductive coupling. That is, induced electromotive force may be generated in the second induction coil 201.

A magnetic field may be generated in the second induction coil 201 by the induced electromotive force generated in the second induction coil 201 and such a magnetic field may change the electrical characteristics of the first induction coil 101.

The current detection part 330 may detect the current of the first induction coil 101, and when the controller 104 detects the change of the detected current at S107, the controller 104 may detect the closure of the container lid of the container body 10 at S109.

Figure 17:
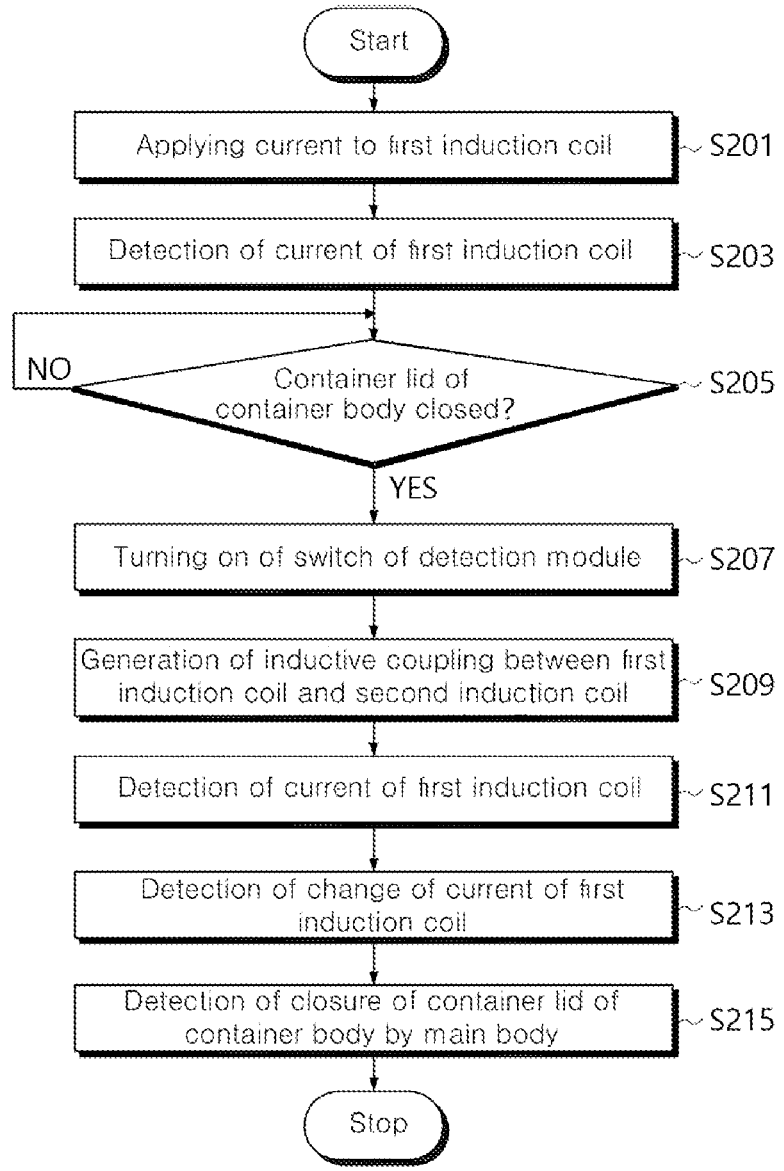
FIG. 17 is a flowchart describing a process in which the main body detects the closure of the container lid according to another embodiment of the present disclosure.

FIG. 17 is a flowchart describing a process in which the main body detects the closure of the container lid according to another embodiment of the present disclosure.

Referring to FIG. 17, according to the blender 1, in a state in which the container body 10 is seated on the main body 30, when current is applied to the first induction coil 101 at S201, the current detection part 330 may detect the current applied to the first induction coil 101 at S203.

Next, whether the container lid 20 of the container body 10 is closed may be determined at S205. Whether the container lid 20 closes the container body 10 may be determined according to whether the triggering member 210 mounted inside a side surface of the upper end part of the container lid 20 is detected by the detection module 151 located at the upper end part of the container body 10.

When the container lid 20 closes the container body 10, the triggering member 210 mounted inside a side surface of the upper end part of the container lid 20 may approach the detection module 151 within a predetermined distance.

Accordingly, when the triggering member 210 approaches the detection module 151 within a predetermined distance due to the closure of the container lid, the switch 151*a* of the detection module 151 may be changed from a turn-off state to a turn-on state at S207.

As described above, when the switch 151*a* is changed from the turn-off state to the turn-on state, the second induction coil 201 and the switch 151*a* may form a closed circuit, so inductive coupling between the first induction coil 101 and the second induction coil 201 may be performed at S209.

Induced electromotive force may be generated in the second induction coil 201 by such inductive coupling, and a magnetic field may be generated in the second induction coil 201 by the induced electromotive force. Such a magnetic field may affect the electrical characteristics of the first induction coil 101, and thus the current of the first induction coil 101 may be changed.

Accordingly, the current detection part 330 may detect a current flowing in the first induction coil 101 after the inductive coupling is generated at S211. Accordingly, the detected current value may be transmitted to the controller 104.

Accordingly, the controller 104 may detect whether there is a change in the current of the first induction coil detected by the current detection part 330 at S213. That is, as described above, the controller 104 may check whether the current flowing in the first induction coil 101 is changed due to the impact of the magnetic field generated in the second induction coil 201.

When the controller 104 detects a change in the current of the first induction coil, the main body 30 may detect the closure of the container lid of the container body 10 at S215.

As described above, when the container lid 20 closes the container body 10, inductive coupling between the first and second induction coils 101 and 201 may be generated, and the controller 104 may detect the closure of the container lid 20 by detecting the change of current in the first induction coil 101 due to such an inductive coupling.

The embodiments of the present disclosure have been described above with reference to the accompanying drawings, but the blender of the present disclosure is not limited to the above embodiments and may be manufactured in a variety of different forms. Those skilled in the art to which the present disclosure belongs will understand that the blender of the present disclosure may be embodied in other specific forms without changing the spirit or essential features of the present disclosure. Therefore, it should be understood that the embodiments described above are illustrative in all respects and not restrictive.

The invention claimed is:

1. A blender comprising:
a main body comprising a first induction coil and a current detection part to detect a current of the first induction coil;
a container body formed of a transparent material and comprising a second induction coil that is capable of inductively couple to the first induction coil in a state that the container body is seated on the main body, and a detection module to selectively allow the second induction coil to inductively couple to the first induction coil; and
a conductive member being a single piece and made of a transparent material,
wherein the second induction coil and the detection module are electrically connected to each other by the conductive member,
wherein the first end of the transparent conductive member is connected to the detection module by a first connector which is detachable from the transparent conductive member, and the second end of the transparent conductive member is connected to the second induction coil by a second connector which is detachable from the transparent conductive member, and
wherein a hole is formed in at least a portion of the transparent conductive member.

2. The blender of claim 1, wherein the conductive member is disposed in a longitudinal direction of the container body from an upper part of the container body to a lower part thereof, wherein a first end of the conductive member is electrically connected to the detection module, and a second end of the conductive member is electrically connected to the second induction coil.

3. The blender of claim 2, wherein the container body comprises inner and outer container bodies, and the conductive member is disposed between the inner and outer container bodies of the container body.

4. The blender of claim 1, wherein the conductive member comprises a transparent electrode film.

5. The blender of claim 4, wherein a portion of the transparent electrode film is configured to be curved.

6. The blender of claim 5, wherein the container body comprises a handle, and an end of the curved portion of the transparent electrode film is configured to extend into the handle to connect with the first connector disposed in a space at the handle.

7. The blender of claim 1, wherein the current detection part detects the current of the first induction coil before and after the inductive coupling between the first and second induction coils.

8. The blender of claim 7, wherein a magnitude of the current of the first induction coil after the inductive coupling is smaller than a magnitude of the current of the first induction coil before the inductive coupling.

9. The blender of claim 7, wherein the main body further comprises a controller,
wherein the controller is configured to determine whether there is a change in the current of the first induction coil detected by the current detection part.

10. The blender of claim 1, further comprising:
a container lid having a triggering member,
wherein the inductive coupling between the first induction coil and the second induction coil is allowed when the container lid closes the container body.

11. The blender of claim 10, wherein the inductive coupling between the first and second induction coils is allowed in a state when the detection module detects the triggering member.

12. The blender of claim 11, wherein the detection module comprises a switch turned on by the triggering member,
wherein the switch is turned on, so that the inductive coupling between the first and second induction coils is allowed in a state that the triggering member is within a predetermined distance of the detection module.

13. The blender of claim 12, wherein the second induction coil and the switch are connected in series to each other, and when the switch is turned on, the second induction coil and the switch form a closed circuit.

14. The blender of claim 12, wherein the triggering member is a magnetic body and the switch is a reed switch.

15. The blender of claim 1, wherein the first and second induction coils are configured to be patterned on first and second printed circuit board (PCB) substrates, respectively, and are wound multiple times on the same planes as the first and second PCB substrates, respectively, in spiral shapes relative to center points of the first and second induction coils.

16. The blender of claim 15, wherein the first and second PCB substrates are parallel to each other to face each other, and are disposed such that the first and second induction coils patterned on the first and second PCB substrates, respectively, have the same center points.

17. The blender of claim 15, wherein the first and second PCB substrates are attachable to and detachable from the main body and the container body, respectively.

18. The blender of claim 1, wherein the main body includes a motor, and when the current of the first induction coil changes, the motor is operable.

19. The blender of claim 18, wherein the main body comprises a controller, and when the controller determines that there is a change in the current of the first induction coil detected by the current detection part, the controller is configured to allow the motor to operate.

* * * * *